Patented Mar. 17, 1925.

1,530,228

UNITED STATES PATENT OFFICE.

WILLIAM A. BRAUN, OF DOVER, OHIO, ASSIGNOR TO DOVER MANUFACTURING COMPANY, A CORPORATION OF OHIO.

COMPOSITE PACK FOR ELECTRICAL HEATING ELEMENTS.

No Drawing.   Application filed January 5, 1923.   Serial No. 610,944.

*To all whom it may concern:*

Be it known that I, WILLIAM A. BRAUN, a citizen of the United States of America, and resident of Dover, in the county of Tuscarawas and State of Ohio, have invented certain new and useful Improvements in Composite Packs for Electrical Heating Elements, of which the following is a specification.

This invention relates to improvements in compositions for making packs for heating elements in which electrical resistance wires are embedded and insulated thereby from the heated members.

Ordinarily, electrical heating elements are made by embedding a resistance wire in a pack composed of cement which is molded in the member to be heated and then subjecting the molded pack to enormous pressure and exceedingly high temperature in order to enhance its di-electric and heat conducting properties. Such packs are ordinarily formed with a base of pulverulent refractory material and a bonding clay, which composition after being highly compressed and heated tends to become brittle and porous.

The objects of the invention are to provide a composition by means of which packs of great density may be formed and which will be practically impervious to moisture and afford permanent insulation for the resistance wire embedded therein and be possessed of high thermal conductivity.

These objects are accomplished by the use of the group of materials compounded and applied as hereinafter set forth.

The invention includes a composite substance, adapted for making packs for electrical heating elements, formed into a dried pack from a plastic mass of cement constituted of a mixture of refractory material, clay and boracic acid moistened with water. The components of the cement are in relative proportions as set forth in the following tabulation:

|  | Per cent. |
|---|---|
| Refractory material | 83 |
| Clay | 12 |
| Boric acid | 5 |

The refractory material employed is such as "alundum fines" commonly known in the art, or may be such other hard, granular or pulverulent material of similar character which is possessed of high thermal conductivity and high di-electric properties.

The clay herein used as an agent for holding the pulverulent refractory material suspended in the mixture when the mixture is moistened and in a plastic state, may be of any suitable character, such, for example, as Klingenberg clay, which has been found satisfactory.

The boracic acid, when introduced into the mixture, is in powdered form.

In preparing the cement, the ingredients are placed in a pebble mill with water approximately equal in quantity to half of the amount of powder, by weight, and therein is ground and worked into a plastic mass. The composition thus formed is then placed in a suitable mixing machine and agitated until used.

The plastic cement is molded or formed into a pack in a manner to embed the resistance wire of the heating element so that the resistance wire is completely encased by the pack. After thus being formed the pack is dried until it becomes hard and is then raised to the normal working temperature of the heating element in which it is used. This heating operation may be carried out by charging the resistance wire initially with electric current of sufficient strength to heat the resistance wire to its working temperature. When the pack is thus heated the boracic acid constituent of the mixture of which the pack is composed, becomes melted, forming boric oxide ($B_2O_3$), which saturates the pack during the initial heating thereof so that the granular particles of the refractory constituent thereof, and the resistance wire encased therein become coated therewith, and the interstices between the particles and about the wire become filled. Thus, the pack is rendered exceedingly dense and its porosity is correspondingly reduced and its di-electric property consequently is preserved. Also, the intimate coating thus formed upon the resistance member prevents its oxidation so that its life is indefinitely protracted.

The constituents of the mixture and their relative proportions, set forth herein as an example, of the invention, are subject to such substitutions and variations of proportions as skill in the art affords, and therefore, my invention is extensive thereto.

What I claim is:—

1. A pack for electrical heating elements, composed of a non-vitrified mass of granular refractory material, clay and boracic acid, the grains of said refractory material being coated with said acid.

2. A pack for electrical heating elements composed of a conglomerate non-vitrified mass of grains of refractory material and clay, and an intermixture of boracic acid forming a coating on said grains and filling the interstices therebetween.

In testimony whereof I affix my signature in presence of two witnesses.

WILLIAM A. BRAUN.

Witnesses:
 CHAS. WENGER,
 ZOE A. MUCKLEY.